(12) United States Patent
Legrand et al.

(10) Patent No.: US 9,984,165 B2
(45) Date of Patent: May 29, 2018

(54) INCREASING SEARCH RESULT VALIDITY

(71) Applicant: Amadeus S.A.S., Sophia Antipolis (FR)

(72) Inventors: Guillaume Legrand, Waltham, MA (US); Charles-Antoine Robelin, Antibes (FR); Luc Isnardy, Cagnes sur mer (FR); Francois Laburthe, Valbonne (FR)

(73) Assignee: AMADEUS S.A.S., Biot (FR)

( * ) Notice: Subject to any disclaimer, the term of this patent is extended or adjusted under 35 U.S.C. 154(b) by 130 days.

(21) Appl. No.: 14/179,815

(22) Filed: Feb. 13, 2014

(65) Prior Publication Data
US 2015/0227631 A1    Aug. 13, 2015

(51) Int. Cl.
*G06F 17/30* (2006.01)

(52) U.S. Cl.
CPC .... *G06F 17/30867* (2013.01); *G06F 17/3053* (2013.01); *G06F 17/3064* (2013.01); *G06F 17/30389* (2013.01); *G06F 17/30457* (2013.01); *G06F 17/30675* (2013.01); *G06F 17/30699* (2013.01)

(58) Field of Classification Search
CPC ......... G06F 17/30867; G06F 17/30522; G06F 17/3053; G06F 17/30395; G06F 17/30551
USPC ....... 707/722, 723, 732, 748, 751, 752, 759, 707/765
See application file for complete search history.

(56) References Cited

U.S. PATENT DOCUMENTS

| | | | |
|---|---|---|---|
| 6,763,362 B2 | 7/2004 | McKeeth | |
| 7,562,027 B1 | 7/2009 | Baggett et al. | |
| 8,037,042 B2 * | 10/2011 | Anderson | ......... G06F 17/30867 |
| | | | 705/14.54 |

(Continued)

FOREIGN PATENT DOCUMENTS

| | | |
|---|---|---|
| EP | 2249261 A1 | 11/2010 |
| EP | 2541473 A1 | 1/2013 |

(Continued)

OTHER PUBLICATIONS

Michael Frasca et al., "Can models of scientific software-hardware interactions be predictive?" Procedia Computer Science, vol. 4, May 14, 2011, pp. 322-331.

(Continued)

*Primary Examiner* — Dangelino N Gortayo
(74) *Attorney, Agent, or Firm* — Thompson Hine LLP

(57) ABSTRACT

Methods, search platforms, systems, and storage media for handling queries in a database system. The database system includes at least one client and at least one search platform. The search platform maintains pre-collected search results which are associated which confidence factors. A confidence factor indicates a probability of the associated pre-collected search result being valid. The search platform receives a query indicating at least one search criterion to the search platform. The confidence factors associated with the identified pre-collected search results are utilized to increase the mean probability of pre-collected search results returned to the client. For example, pre-collected search results complying with the at least one search criterion and being (Continued)

associated with confidence factors having values exceeding a given threshold are returned to the client.

22 Claims, 11 Drawing Sheets

(56) References Cited

U.S. PATENT DOCUMENTS

| | | | | |
|---|---|---|---|---|
| 8,082,247 | B2* | 12/2011 | Kumthekar | G06F 17/30867 707/727 |
| 8,560,356 | B2* | 10/2013 | DeMarcken | G06Q 10/02 705/5 |
| 8,600,918 | B2* | 12/2013 | Setoguchi | G06N 99/005 706/1 |
| 8,615,512 | B2* | 12/2013 | Wexler | G06F 17/30867 707/723 |
| 8,694,346 | B2* | 4/2014 | Crean | G06Q 10/02 705/5 |
| 8,700,653 | B2* | 4/2014 | Hansson | G06F 17/3064 707/731 |
| 8,706,716 | B2* | 4/2014 | Kuznetsov | G06F 17/30867 707/722 |
| 8,725,732 | B1* | 5/2014 | Jeh | G06F 17/30707 707/736 |
| 8,832,088 | B1* | 9/2014 | Chen | G06Q 30/00 707/705 |
| 8,898,153 | B1* | 11/2014 | Kim | G06F 17/30864 707/723 |
| 8,943,043 | B2* | 1/2015 | Lymberopoulos | G06F 17/30902 707/721 |
| 8,972,391 | B1* | 3/2015 | McDonnell | G06F 17/3053 707/727 |
| 8,972,394 | B1* | 3/2015 | Tong | G06F 17/3071 707/728 |
| 9,009,146 | B1* | 4/2015 | Lopatenko | H04L 29/06 707/723 |
| 9,128,988 | B2* | 9/2015 | Cheng | G06F 17/3053 |
| 2003/0200194 | A1 | 10/2003 | Arnold et al. | |
| 2004/0128346 | A1 | 7/2004 | Melamed et al. | |
| 2004/0249683 | A1* | 12/2004 | Demarcken | G06F 17/30457 705/5 |
| 2005/0234971 | A1 | 10/2005 | Folkert et al. | |
| 2007/0094254 | A1* | 4/2007 | Cutts | G06F 17/30864 707/999.005 |
| 2008/0167906 | A1* | 7/2008 | De Marcken | G06Q 10/02 705/5 |
| 2008/0167973 | A1 | 7/2008 | De Marcken | |
| 2008/0262878 | A1 | 10/2008 | Webby et al. | |
| 2009/0204753 | A1 | 8/2009 | Bridge, Jr. et al. | |
| 2010/0153143 | A1* | 6/2010 | Baggett | G06Q 10/02 705/5 |
| 2011/0055202 | A1 | 3/2011 | Heimendinger | |
| 2011/0295844 | A1* | 12/2011 | Sun | G06F 17/30864 707/723 |
| 2012/0330693 | A1 | 12/2012 | Ciabrini et al. | |
| 2013/0024404 | A1 | 1/2013 | Zacharia et al. | |
| 2013/0073323 | A1* | 3/2013 | Zacharia | G06Q 10/025 705/5 |
| 2013/0073586 | A1 | 3/2013 | Aubry et al. | |
| 2014/0052750 | A1 | 2/2014 | Ciabrini et al. | |
| 2014/0149399 | A1* | 5/2014 | Kurzion | G06F 17/30867 707/723 |
| 2014/0280293 | A1* | 9/2014 | Scanlon | G06F 17/3048 707/769 |
| 2014/0310232 | A1* | 10/2014 | Plattner | G06F 17/3048 707/602 |
| 2015/0227624 | A1* | 8/2015 | Busch | G06F 17/30982 707/728 |

FOREIGN PATENT DOCUMENTS

| | | |
|---|---|---|
| WO | 99/22315 A2 | 5/1999 |
| WO | 2013160721 A1 | 10/2013 |
| WO | 2014026753 A1 | 2/2014 |

OTHER PUBLICATIONS

Baldi, et al. "Modeling the Internet and the Web: Probabilistic Methods and Algorithms" in Modeling the Internet and the Web: Probabilistic Methods and Algorithms, Jan. 1, 2003, Wiley, ISBN: 978-0-47-084906-4 pp. 161-167.
European Patent Office, European Search Report issued in application No. 14290034.9 dated Jun. 6, 2014.
Guillaume Legrand, U.S. Appl. No. 14/183,911, filed Feb. 19, 2014 entitled Long-Term Validity of Pre-Computed Request Results.
Rob Lancaster, "Survival Analysis & TTL Optimization", O'Reilley Conferences, Feb. 28, 2012, Santa Clara, CA.
European Patent Office, Official Action issued in Application No. 14 290 034.9 dated Jun. 27, 2016.
USPTO, Notice of Allowance issued in U.S. Appl. No. 14/183,911 dated Oct. 21, 2016.
USPTO, final Office Action issued in U.S. Appl. No. 14/183,911 dated Apr. 14, 2016.
USPTO, Office Action issued in U.S. Appl. No. 14/183,911 dated Nov. 24, 2015.
European Patent Office, search report issued in application No. 14290040.6 dated May 30, 2014.
Choo et al, "Synchronizing a Database to Improve Freshness" Proceedings of the 2000 ACM Sigmod International Conference on Management of Data, vol. 29, No. 2, Jun. 1, 2000, pp. 117-128.
Carney et al., "Scalable Application-aware Data Freshening", Proceedings of the 19th International Conference on Data Engineering, Mar. 5, 2003, pp. 481-492.
Sundaresan, et al., "Slacker Coherence Protocol for Pull-based Monitoring of On-line Data Sources", Proceedings of the International Symposium on Cluster Computing and the Grid, May 12, 2003, pp. 250-257.
Lehner et al., "Fast Refresh Using Mass Query Optimization", Proceedings of the International Conference on Data Engineering, Apr. 2, 2001, pp. 391-398.
Vu et al., "On Scheduling Data Loading and View Maintenance in Soft Real-time Data Warehouses", 15th International Conference on Management of Data Comad, Dec. 12, 2009.

* cited by examiner

INCREASING SEARCH RESULT VALIDITY

BACKGROUND

The invention generally relates to computers and computer software and, in particular, to methods, systems, and computer program products for increasing the validity or confidence of search results retrieved from a pool of pre-computed or pre-collected search results.

A common object in database technology is to ensure short response times to database queries that require the processing of large volumes of data. For example, such computing-power consuming processing has to be performed in response to so-called "open queries", which contain little input information (e.g., only one or two parameters out of many possible parameters are specified and/or the specified value ranges of the parameters are broad). Consequently, such open queries may generally lead to a large number of results. Possibilities to speed up data processing by increasing hardware performance are limited. Thus, attention is drawn to improving the mechanisms underlying the processing of large data volumes.

One approach to shorten query times may be to pre-compute or pre-collect expected results to queries and to maintain the corresponding query results in a pool of pre-computed or pre-collected results. Queries are then not processed on the large, distributed, and/or complex-to-calculate data basis, but are directed to the pool. For example, this approach is employed by Internet search engines that utilize automated robots or crawlers to collect content of web servers and store this pre-collected content in a search engine repository. Internet search queries are then answered on the basis of the repository, instead of retrieving the web servers' primary content at search query time.

However, a disadvantage of this approach is that the pre-computed or pre-collected query results get outdated if the underlying primary data changes. In this case, the pool of pre-computed or pre-collected results may return incorrect results to the inquiring client. This issue may be somewhat remedied by improving the validity or correctness of the pre-computed or pre-collected query results by optimizing the re-computation or re-collection strategy, for example, by re-computing or re-collecting these query results with priority that are likely outdated. However, perfect validity or correctness of the pre-computed or pre-collected query results at all times is unachievable.

Improved methods, systems, and computer program products are needed that increase the validity or confidence of search results retrieved from a pool of pre-computed or pre-collected search results.

SUMMARY

According to an embodiment of the invention, a method of handling queries in a database system is provided. The database system has at least one client and at least one search platform. The search platform maintains pre-computed search results that are associated which confidence factors. A confidence factor indicates a probability of the associated search result being valid. A query indicating at least one search criterion is received by the search platform. The search platform utilizes the confidence factors associated with the identified pre-collected search results to increase the mean probability that the pre-collected search results returned to the client in response to the query are valid.

In some embodiments, the search platform utilizes the confidence factors associated with the identified pre-collected search results by returning only pre-computed search results, which are associated with confidence factors having values exceeding a given threshold.

In an embodiment, a method is provided for handling queries at a search platform maintaining pre-collected search results associated with confidence factors, where each confidence factor indicating a probability of the associated pre-collected search result being valid. The method includes receiving, at the search platform, a query from a client indicating at least one search criterion. The method further includes utilizing, with the at least one search platform, the confidence factors associated with the pre-collected search results to increase the mean probability that the pre-collected search results returned to the client in response to the query are valid. The returned pre-collected search results comply with the at least one search criterion.

In another embodiment, a system is provided for determining a payment strategy for a payment platform. The system includes at least one processor and program code configured to be executed by the at least one processor to cause the at least one processor to maintain pre-collected search results being associated which confidence factors, receive a query from a client, the query indicating at least one search criterion, and utilize the confidence factors associated with the identified pre-collected search results to increase the mean probability that the pre-collected search results returned to the client in response to the query are valid. Each confidence factor indicates a probability of the associated search result being valid. The returned pre-collected search results comply with the at least one search criterion.

In yet another embodiment, a system is provided that includes a search platform and a client configured to transmit a query indicating at least one search criterion to the at least one search platform. The search platform is configured to maintain pre-collected search results being associated with confidence factors. Each confidence factor indicates a probability of the associated search result being valid. The search platform is further configured to utilize the confidence factors associated with the identified pre-collected search results to increase the mean probability that the pre-collected search results returned to the client in response to the query are valid. The returned pre-collected search results comply with the at least one search criterion.

In yet another embodiment, a computer program product includes a non-transitory computer readable storage medium and program code stored on the computer readable storage medium and configured, upon execution, to cause at least one processor to maintain pre-collected search results being associated with confidence factors, wherein a confidence factor indicates a probability of the associated search result being valid, receive a query from a client, the query indicating at least one search criterion, and utilize the confidence factors associated with the identified pre-collected search results to increase the mean probability that the pre-collected search results returned to the client in response to the query are valid. The returned pre-collected search results comply with the at least one search criterion.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Embodiments of the invention are directed to increasing the validity of search results that have been pre-collected or pre-computed and that are returned to a client in response to a search query. Generally, the embodiments of the invention are directed to estimating the validity of pre-computed or pre-collected search results and to utilize this validity estimation in order to return pre-computed or pre-collected search results to the client that are probably valid. This differs from a strategy of increasing the validity of pre-computed or pre-collected search results by optimizing the re-computation or re-collection process, which is performed asynchronous to the occurrence of search queries.

Figure 1:
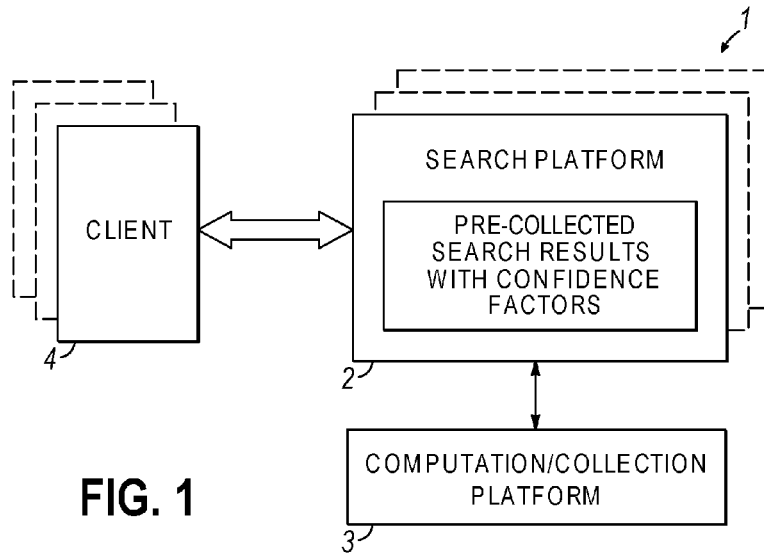
FIG. 1 gives an overview of a system including at least one client and a server maintaining pre-computed search results.
Figure 2:
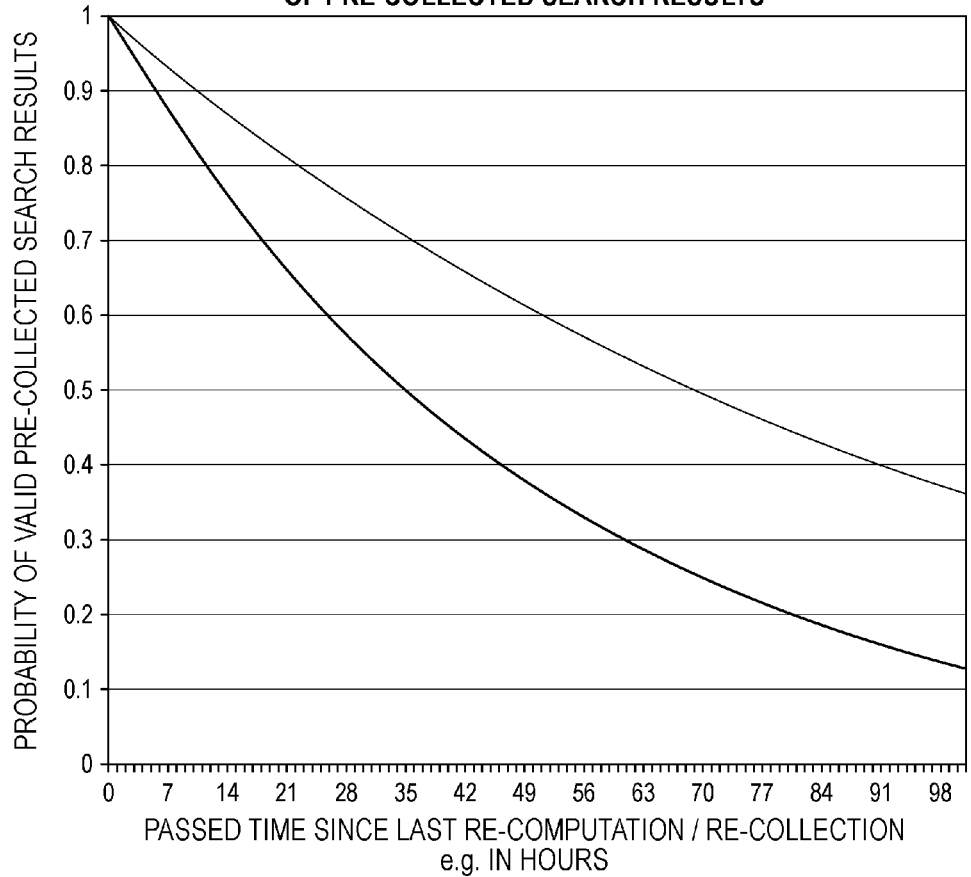
FIG. 2 visualizes the effect of the likelihood decreasing over time that pre-computed search results kept in the server are valid.
Figure 3:
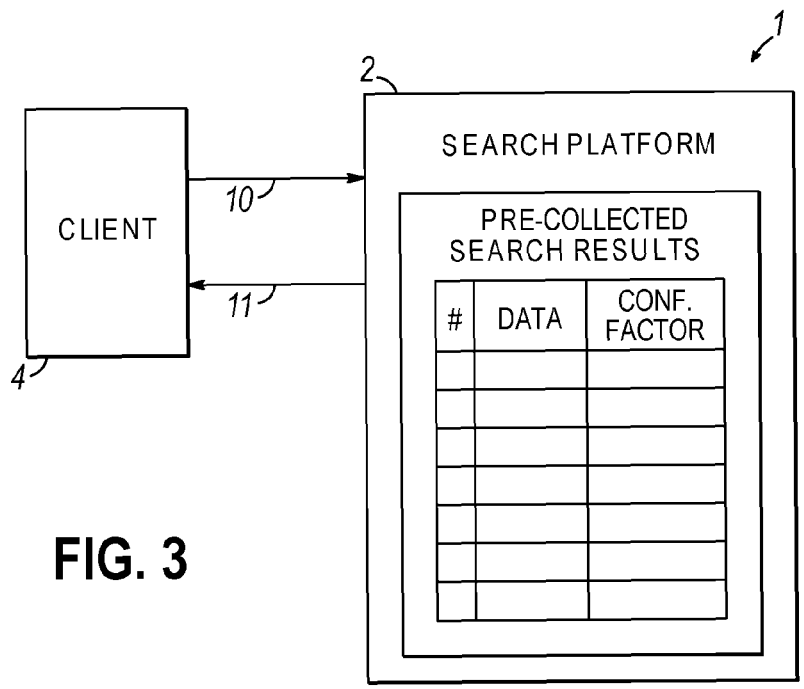
FIG. 3 shows a search platform maintaining pre-computed search results and associated confidence factor values.

Before turning to the detailed description with reference to FIGS. 4 to 15, some general aspects will be set forth first on the basis of FIGS. 1 to 3.

The embodiments of the invention generally relates to handling search queries in a database system maintaining pre-computed or pre-collected search results. An exemplary database system 1 is shown by FIG. 1. The database system 1 includes at least one, but generally a plurality of clients 4 and at least one search platform 2. To increase failure safety or performance, a plurality of search platforms 2 may be present. The at least one search platform 2 maintains pre-computed or pre-collected search results in order to decrease response times to answer search queries received by the clients 4. Hereinafter, the term "pre-collected" is used to cover any sort of pre-collection and pre-computation such as simple Internet crawlers collecting or copying the content of Internet web servers, but also complex and time-intensive computations of search results on the basis of underlying data. The term "database" is meant to encompass any types of structured information storage system such as standard stand-alone databases like SQL server or Oracle databases as well as complex, distributed and/or proprietary storage systems, relational databases including database management systems or object-oriented database systems.

The client 4 directs search queries to the search platform 2 including one or more search criteria or parameters. For example, if a search query is an Internet search, the search query might carry a search string, search text or search phrase as search criteria. A further search criterion may be the language of websites to be searched or an indication of a point of time of the first availability of the requested search string, search text or search phrase. According to another example, the search query is a database request for a product or service offered by a service provider platform such as an Internet book store or a travel provider. In that case, the search query might include, for example, an upper price limit or a price range for the service or product and desired characteristics of the product/service such as book title, travel origin and destination, etc.

The search platform 2 processes a search query received from the client 4 and performs a database search within the pre-collected search results. In turn, search platform 2 responds with one or more pre-collected search results fulfilling the search criteria included in the search query. The client 4 receives this response and presents the search results to the user.

The pre-collection of search results is performed by using computation/collection platform 3. Generally, search platform 2 or another control entity (cf. FIG. 14) employs an appropriate re-collection strategy in order to update the pre-collected search results stored by search platform 2. To this end, search platform 2 or the other control entity generates and transmits re-collection orders to computation/collection platform 3. Computation/collection platform 3 executes the re-computation or re-collection, for example by requesting original data corresponding to the pre-collected search results from primary data sources. Any suitable re-collection strategy for updating the pre-collected search results may be employed; for example, the update strategies as described by International Application No. PCT/EP2013/002390, which is hereby incorporated by reference herein.

The validity or correctness of pre-collected search results returned to client 4 in response to search queries are not improved through the selection of a particular re-collection strategy. Rather, the improvements in the validity or correctness of pre-collected search results that are actually returned to the client 4 occur at the time of an incoming search query. In essence, it is proposed to return only such pre-collected search results to the client 4 that have a certain likelihood of being valid, while refraining from returning pre-collected search results to client 4 that have a certain likelihood of being invalid.

To this end, the pre-collected search results maintained by search platform 2 are associated with confidence factors. For example, each pre-collected search result stored by search platform 2 has a corresponding confidence factor. Alternatively, one confidence factor may be associated with a plurality of pre-collected search results. A confidence factor indicates a probability of the associated pre-collected search result(s) being valid. In general, confidence factors associated with pre-collected search results are utilized in order to decide which pre-collected search results are returned to the client 4 in response to a search query and which pre-collected search results are not returned to the client 4 and/or are returned to the client 4 in a specific way.

In order to make this decision, the confidence factors are utilized in order to generally provide the client 4 with pre-collected search results having a higher probability of being valid than pre-collected search results that would have been returned to the client without utilizing the confidence factors. The confidence factors may be utilized in different ways in order to provide the client 4 with potentially more valid pre-collected search results, as will be described below.

In some embodiments, a confidence threshold is employed. This confidence threshold is either prescribed by the client 4. For example, the client 4 includes a threshold value (such as "at least 85%" or "at least 0.9" or "high" being likewise defined as "at least 0.9") in the search query when requesting search results from the search platform 2. The client 4 may also send dedicated asynchronous messages indicating a desired confidence threshold to the search platform 2. Search platform 2 stores these client-specific confidence threshold prescriptions and employs them each time a search query is received from client 4. Alternatively, in other embodiments, the confidence threshold is set by a third party such as the operator of the search platform 2. In this case, a single confidence threshold value may be applicable for all search queries received from all clients 4. The clients 4 may not have an influence on the confidence threshold employed by the search platform 2. Alternatively, the confidence threshold pre-set by the third party may act as a default value and clients 4 may be able to override this default value by an own client-specific prescription.

Generally, in some embodiments, irrespective of the way the confidence factor is set and whether or not the confidence factor is client-specific, the client 4 is provided with search results that are associated with a confidence factor value exceeding the confidence threshold, wherein "exceeding" may also include the case that the confidence factor value equals the confidence threshold (i.e., the confidence factor value is greater than or equal to the confidence threshold). In some embodiments, the client 4 is only provided with pre-collected search results for which the confidence factor value exceeds (i.e., is greater than) the confidence threshold. In other embodiments, the client 4 may initially also be provided with pre-collected search results below (i.e., less than) the confidence threshold, while the search platform performs a validation of these pre-collected search results below the threshold and updates the tentatively returned pre-collected search results below the threshold with the corresponding validated search results. These mechanisms have the effect that pre-collected search results at the search platform 2 that have a higher likelihood of being invalid are either not returned at all to the client or updated with search results having a higher likelihood of being valid, thereby increasing the accuracy of the search results for the clients 4 while still maintaining the advantage of short response times due to the pre-collection of search results. Particular examples of arrangements for the client's provision with pre-collected search results exceeding the confidence threshold are given further below with reference to FIGS. 4 to 13.

The function of the confidence factor to indicate a validity probability of pre-collected search results is exemplarily implemented by a probabilistic model utilizing the following parameters:

The age $t_i$ of a pre-collected search result refers to the time passed since the last re-computation or re-collected of this pre-collected search result by the computation/collection platform 3. The validity rate $\lambda_i$ of the pre-collected search result i is a measure of how long the pre-collected search result i remains valid or how fast the pre-collected search result i becomes invalid due to changes of the underlying original data. This validity rate of a given pre-computed search result i is, for example, statistically derived from the occurrence and the outcomes of past (re-)computations or (re-)collections and comparisons of the re-collected search result with its previous state or values. For example, it has been determined that a particular pre-collected search result i has a validity rate $\lambda_i$ of 10% per hour meaning that the probability of i being valid decreases by 10% every hour. At the time of its (re-)collection or (re-)computation, i is generally 100% valid. After one hour, i is valid with a probability of 90%. After two hours, the validity of i is 81% (=90% decreased by another 10%). After three hours, i's probable validity is at 72.9%, and so on.

The validity rate $\lambda_i$ may be employed to provide an estimate of the probability P for a pre-collected search result to stay valid after a given time: P(unchanged after t)=$e^{-\lambda t}$. This is also referred to as the probability the expected accuracy $acc_i^t=e^{-\lambda t}$ or, more general, as the probability of a pre-collected search result being still valid.

Two exemplary functions of this probable validity or accuracy decreasing over time are depicted by FIG. 2. The upper function represents a pre-collected search result which potentially remains more accurate (or, more correctly, stays at a higher probability of being valid over time) than another pre-computed search result associated with the lower function. For example, the pre-computed search result represented by the upper function has 70% probability of being still valid at 35 hours after its last re-collection, while the other pre-computed search result characterized by the lower function is only valid up to about 50% at 35 hours after its latest re-collection. Both functions may also represent whole sets of pre-collected search results and accordingly indicate proportions of the sets of pre-collected search results likely being valid at a time passed since the last re-collection of the set.

In some embodiments, the confidence factor values are derived from such probabilistic model modelling the validity of pre-collected search results over time. More specifically, in some embodiments, the probability of a pre-collected search result i being valid at a time t after a previous collection of the pre-collected search result i is given by $e^{-\lambda t}$. As outlined before, $\lambda_i$ denotes a rate of the $i^{th}$ pre-collected search result becoming invalid.

In some embodiments, the confidence factors $e^{-\lambda t}$ associated with the pre-collected search results are maintained by the search platform 2 (or another entity) in form of stored values of the pre-collected search results' validity rate $\lambda$ and the timestamps TS of the last re-collected or re-computation of the pre-collected search results. Thus, for a particular pre-collected search result i, search platform 2 stores the validity rate $\lambda_i$ and the timestamp $TS_i$. These values are not changing over time, but are constant until the next re-collection of i. At search time, i.e., when a search query is received by search platform 2, the confidence factor value of the $i^{th}$ pre-collected search result, $e^{-\lambda t}$, is calculated from by using $\lambda_i$ and $TS_i$ wherein t in $e^{-\lambda t}$ results from $TS_s$–$TS_i$, $TS_s$ referring to the time of the search query's arrival at search platform 2. Thus, in these embodiments, the confidence factor is associated with the pre-collected search results by having the values of λ and TS stored for each pre-collected search result (or sets of pre-collected search results).

A basic setting of client 4 and search platform 2 is shown by FIG. 3. Search platform 2 runs a database with pre-collected search results. As shown by FIG. 3, the pre-collected search results include, for example, an index (visualized by "#" in FIG. 3), the search result data (indicated by "Data" in FIG. 3) including, for example, data fields which are defined as primary key values and secondary key values as well as confidence factor values (referred to as "Conf. Factor" in FIG. 3). As outlined before, in some embodiments, the confidence factor values are stored in the database in form of the values λ and TS being associated with each of the pre-collected search result. Client 4 directs a search query 10 to search platform 2. Search platform 2 processes the search query 10 and performs a search in the database in order to determine pre-collected search results fulfilling search criteria transmitted with the search query. Search platform 2 generally returns pre-collected search results by message 11 which meet the confidence threshold. In other embodiments, the confidence factors being associated with the pre-collected search results stored by the search platform 2 are not stored in the same database tables, partition, or database as the pre-collected search results, but are maintained in a separate database or station and retrieved from there by the search platform 2 at the time of processing a search query (cf. also FIG. 12 discussed further below).

Figure 4:
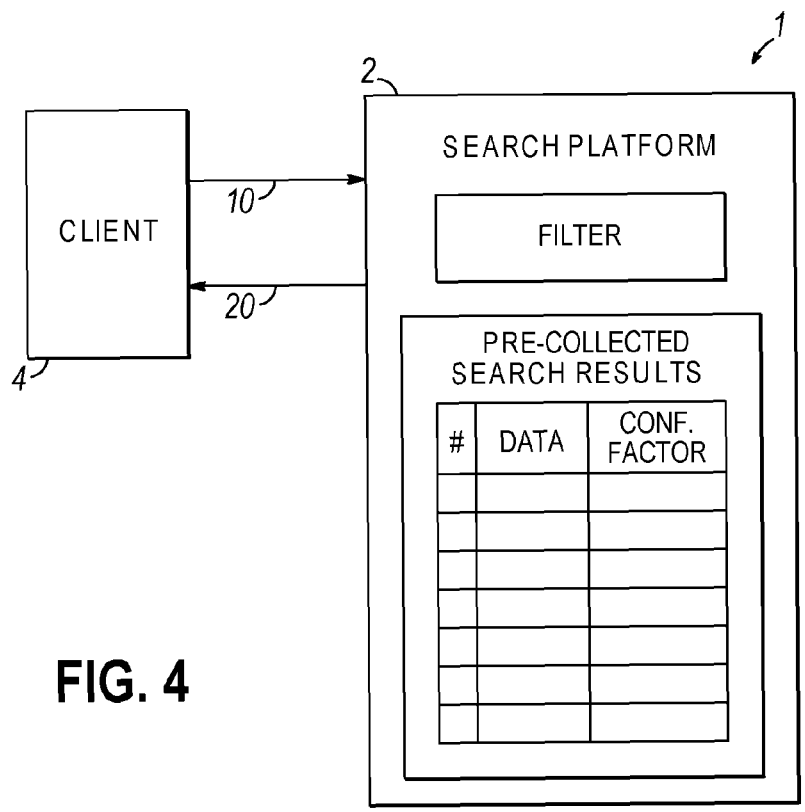
FIG. 4 shows a first example of the search platform internally utilizing a filter on the basis of the confidence factor threshold.
Figure 5:
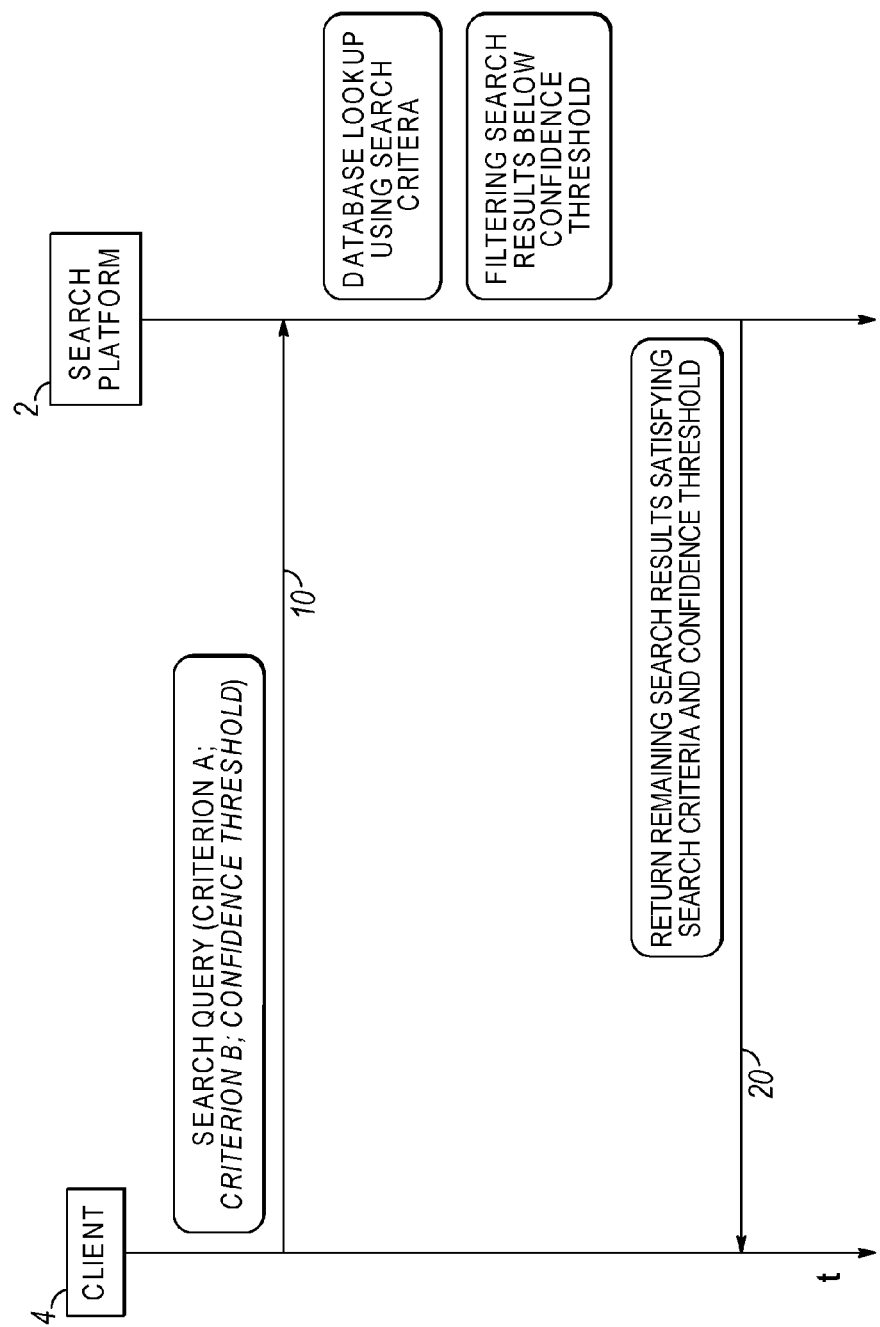
FIG. 5 is a message sequence chart relating to the example of FIG. 4.

Now referring to the more detailed description of exemplary implementations of the mechanisms described in a more general manner above, FIGS. 4 and 5 illustrate a first example according to which search platform 2 ensures that client 4 receives only search results fulfilling the confidence threshold by filtering out pre-collected search results with confidence factor values below the confidence threshold. As previously described with reference to FIG. 3, the client 4 generates and transmits a search query 10 to search platform 2. Search query 10 includes one or more search criteria such as a search string for an Internet search. Search platform 2 performs a database lookup in the database of pre-collected search results and retrieves pre-collected search results fulfilling the at least one search criterion passed over with the search query 10. As a sort of post-processing activity, the search platform 2 then filters out those pre-collected search results from the set of pre-collected search results resulting from the database lookup which do not meet the confidence threshold, i.e., which have confidence factor values below the confidence threshold. These filtered pre-collected search results are not returned to the client 4. Rather, the search platform 2 only returns these pre-collected search results uncovered by the database lookup which have confidence factor values at or above the confidence threshold. These results are returned to the client 4 by message 20 (FIG. 4).

FIG. 5 is a message sequence chart visualizing the message flow of this first implementation example. As indicated by FIG. 5, the search query includes one or more search criteria, for example, in the exemplary case of a travel-related query, parameters for the travel the user is interested in such as an origin and destination pair and a timeframe for the travel (FIG. 5: "criterion A", optional "criterion B"). Optionally, search query 10 also includes a value for the confidence threshold (FIG. 5: "confidence threshold"). Alternatively, the search platform 2 utilizes a predetermined confidence threshold in an autonomous manner, i.e., without receiving a confidence threshold in the search query 10. For example, search platform 2 is provided with a default value for the confidence threshold prior to receiving the search query 10.

Search platform 2 then performs the database lookup in its pool of pre-collected search results on the basis of the one or more search criteria which were received as content of the search query 10. Subsequently, search platform 2 filters out these search results with confidence factor values below the confidence threshold and returns, by message 20, only those pre-collected search results with confidence factor values at or above the confidence threshold.

As an advantage of this implementation example, client 4 is provided with search results in a similar fast manner than a normal query to search platform 2 without a utilization of the confidence factor as presented herein. On the other hand, the filter activity by search platform 2 may result in "holes" in the set of pre-collected search results produced by the search platform's database lookup. Depending on the value of the confidence threshold and the values of confidence factors of the retrieved pre-collected search results, a substantial part of potential search results the user is interested in may be missed due to the filter activity and not returned to client 4. This may nevertheless be acceptable for particular applications, for example, the retrieval of advertisement banners which are of potential interest to the user on web pages.

Figure 6:
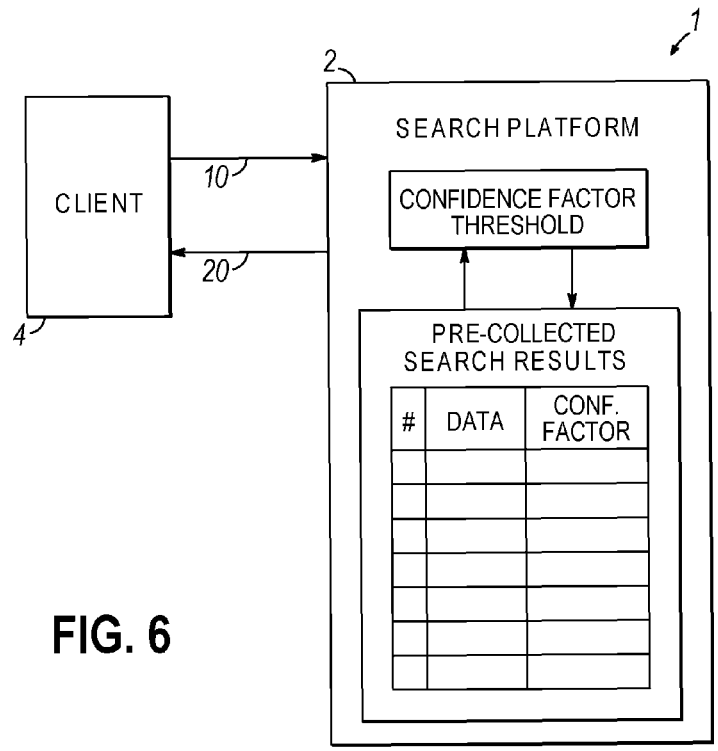
FIG. 6 illustrates a second example according to which the search platform employs a confidence factor threshold as an additional search criterion.
Figure 7:
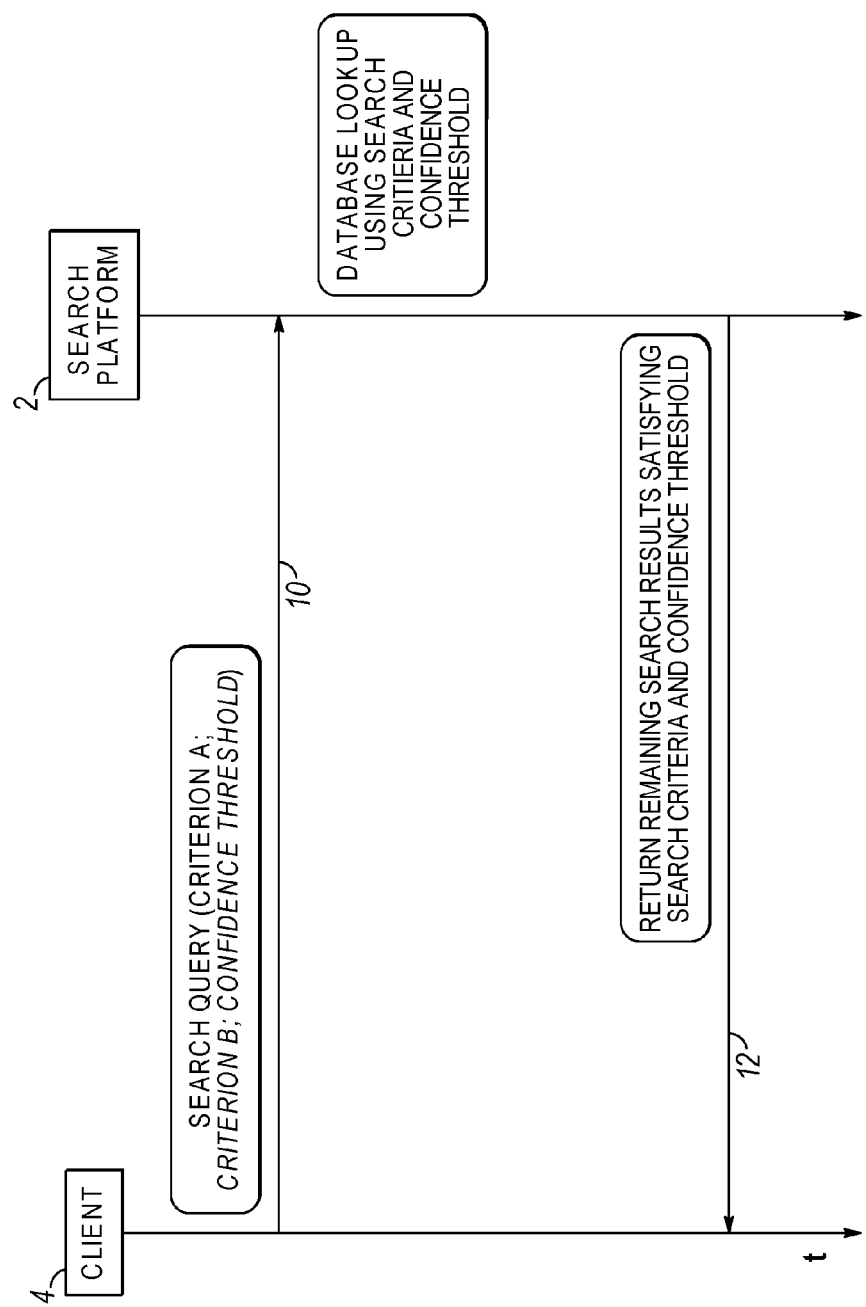
FIG. 7 depicts a message flow of the example of FIG. 6.

According to a second example, the search platform 2 utilizes the confidence threshold as an additional search criterion (FIGS. 6 and 7). Basically, in this second example, search platform 2 utilizes the confidence threshold as a search criterion in addition to the at least one search criterion included in the search query 10. FIG. 6 visualizes the interaction between client 4 and search platform 2, while FIG. 7 shows the message sequence between both entities.

Client 4 generates and transmits search query 10 to the search platform 2 in a similar manner as described in the first implementation example before.

After the search platform 2 has received the search query 10, the search platform 2 performs a lookup in its database of pre-collected search results. On the one hand, this database lookup is based on the at least one search criterion included in the search query 10 as in the first implementation example. On the other hand, however, the database lookup is also based on the confidence threshold which is either prescribed by the client (e.g., by being included in the search query 10) or is available internally in the search platform 2. In essence, the confidence threshold functions as an additional search criterion, i.e., the database lookup only retrieves such pre-collected search results which have associated confidence factors with values being at or above the confidence threshold. Other pre-collected search results which fulfil the at least one search criterion included in the search query 10, but not the confidence threshold, are not returned by the database lookup. The pre-collected search results uncovered by the database lookup are returned by the search platform 2 to the client with message 12 (cf. FIGS. 4 and 5).

This second example of utilizing the confidence threshold as an additional search criterion has the effect that "holes" in the set of resulting pre-collected search results as they may occur in the first example described above with reference to FIGS. 4 and 5 can be avoided. For example, the search query 10 is directed to find the cheapest flights from Munich to Paris within a three day time interval. The search platform 2 may generally operate in a manner that for each of the three days, the five cheapest flights stored as pre-collected data records are returned to the client 4. It may be the case that all of the five cheapest flights, for example, on the third day have a confidence factor value below the confidence threshold with the effect that they are not returned to the client 4 by the first example according to which the search platform 2 is arranged to filter out these pre-collected search results not fulfilling the confidence threshold. If, however, the confidence threshold is used as an additional search criterion, the search platform 2 determines the five cheapest flights on the third day which also fulfil the confidence threshold. Thus, client 4 is provided with search results for all three days satisfying the given confidence requirements.

Figure 8:
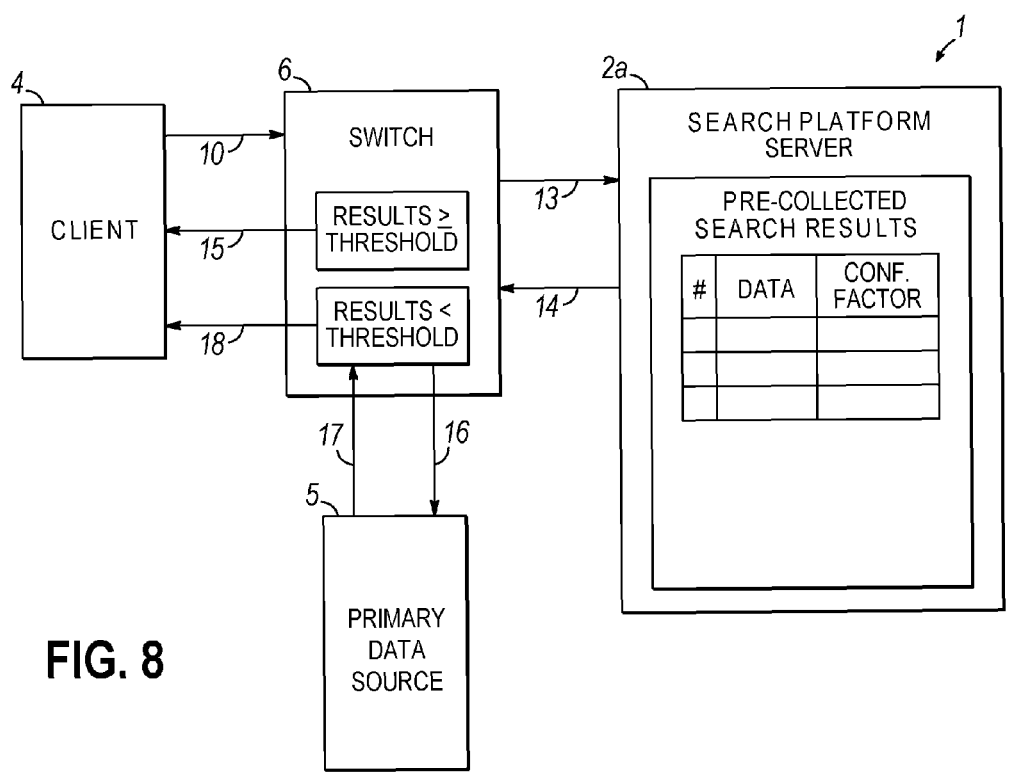
FIG. 8 explains a third example according to which the confidence factor threshold is employed to perform a further query in a primary data source in response to the server's query results.
Figure 9:
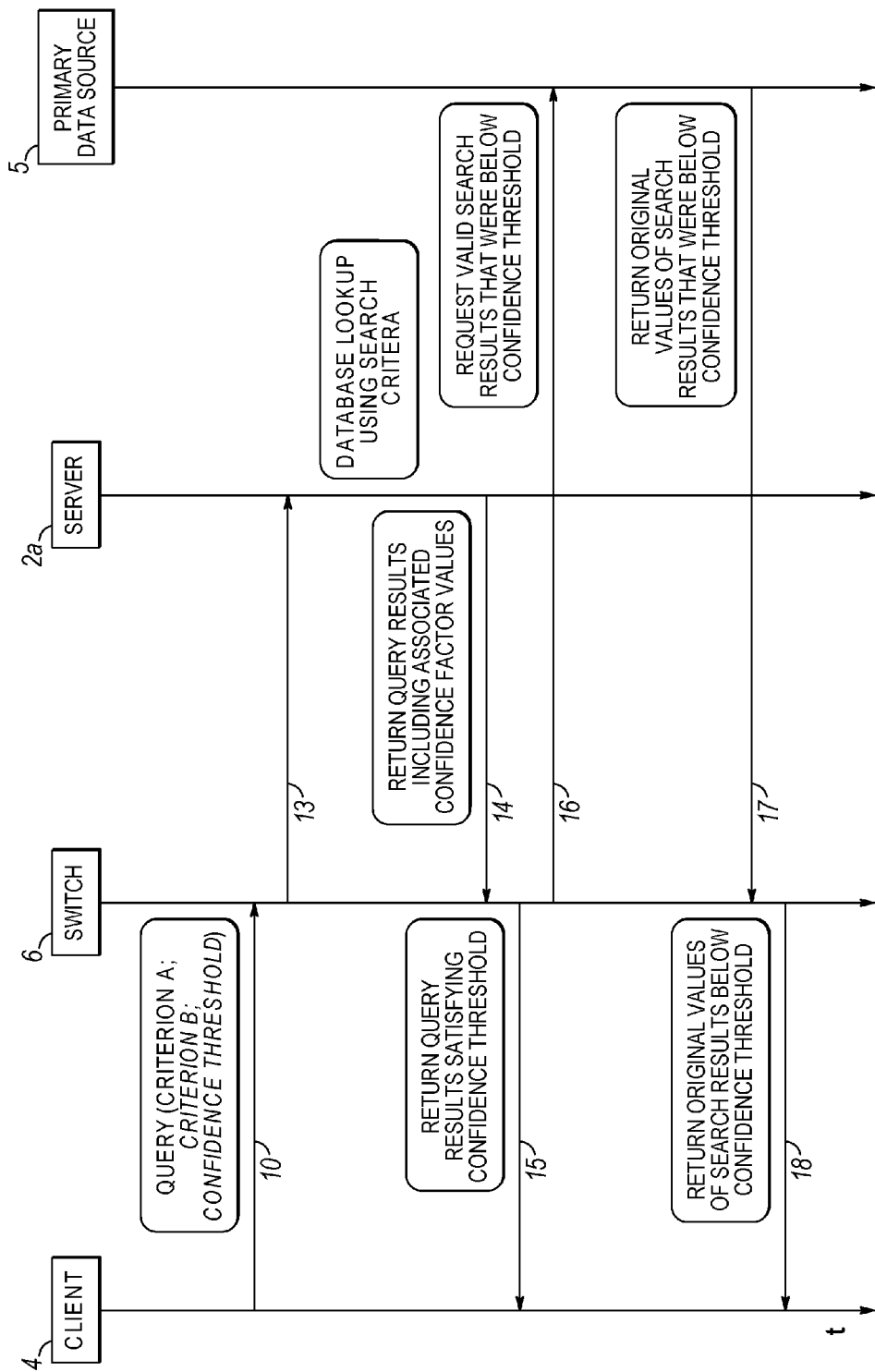
FIG. 9 presents a message sequence of the example of FIG. 8.

FIGS. 8 and 9 present a third example according to which client 4 only receives search results satisfying the confidence threshold. According to this third example, search platform 2 includes a search platform server 2a as well as an entity located upstream the search platform server 2a, i.e. an intermediate element between the client 4 and the server 2a. This entity is herein referred to as switch 6. The client 4 directs its search query to server 2a. However, the search query is transmitted via switch 6 to the server 2a. More specifically, switch 6 receives search query 10 from client 4 and relays search query 10 to server 2a in form of message 13.

The server 2a then performs a database search on the basis of the stored pre-collected search results in accordance with the search criteria included in the search query 10. The server 2a then, by message 14, returns pre-collected search results fulfilling the search criteria together with the confidence factor values associated with these pre-collected search results. It is noted that the database search conducted by the server 2a is not limited to any pre-collected search results being associated with a certain confidence factor threshold. Rather, the server 2a returns pre-collected search results to the switch 6 irrespective of their associated confidence factor values.

It is then a function of switch 6 (forming a logical part of the search platform 2) to utilize the confidence factor threshold. As outlined above, the threshold may either be set by the client, for example, by including a threshold value in the search query 10 (or into any other message transmitted asynchronously to search query 10) or, alternatively, be autonomously set by switch 6, for example, by utilizing a given default value. The switch 6 evaluates the confidence factor values of the pre-collected search results received from the server 2a by message 14. Pre-collected search results being associated with confidence factor values at or above the threshold are forwarded unchanged to the client 4 by message 15. Pre-collected search results having confidence factor values below the threshold are not forwarded to the client 4. Rather, the switch initiates a secondary database search at a primary data source 5 by messages 16 and 17. The primary data source may maintain original data that is not pre-collected. This secondary database search thus validates the pre-collected search results received from the server 2a with confidence factor values below the threshold. The validated search results received by switch 6 from the primary data source 5 with message 17 are thus 100% valid.

The switch 6 then returns the search results to the client 4 by messages 15 and 18. Note that message 15 may either by sent to the client 4 immediately after the respective pre-collected search results received by switch 6 from server 2a with message 14 have been recognized to be associated with confidence factor values at or above the threshold, while message 18 are only sent after the secondary database search with the primary data source 5 has been performed. Thus, in this setting, messages 15 and 18 are sent separately at different points of time. In another setting, message 15 may be held back by switch 6 until the validated search results have been received from the primary data source 5 with message 17. In this case, messages 15 and 18 are sent at the substantially same point of time. They may also be sent as a single combined message.

It is also possible to subdivide messages 15 and 18 into smaller messages, for example, atomic messages each conveying a single search result. In this way, switch 6 is able to provide the client 4 with pre-collected search results having confidence factor values above the threshold and/or search results validated with the primary data source 5 in an incremental manner. Accordingly, client 4 might be arranged to display incrementally arriving search results in an incremental manner to the user.

Optionally, the validated search results may not only be forwarded to client 4, but also to server 2a for including the validated search results in the database of the server 2a. In this manner, the revalidation of the pre-collected search results below the confidence threshold are leveraged for future search queries as they may not require re-validation, but may have confidence factor values above the threshold and, thus, may be returned to client 4 without re-validation.

The switch 6 and server 2a forming the search platform 2 may be implemented as an integrated entity or implemented as separate elements or modules. For example, switch 6 may be implemented as a software module with the same hardware station of server 2a. In some embodiments, switch 6 is implemented by separate hardware. In this case, switch 6 may serve more than one server 2a and may therefore operate as a unified interface for a plurality of servers 2a.

A chronological message sequence and activities by the various entities is visualized by FIG. 9. The process starts with search query 10 issued by client 4. The search query 10 includes at least one search criterion ("criterion A"). Generally, search query 10 will contain more than one search criterion, as indicated by italicized "criterion B". For example, if search query 10 is a travel-related request such as a request for flight connections directed to server 2a being a travel recommendation search platform, search query 10 might include, e.g., the four search criteria or search parameters origin city (e.g., Nice), destination city (e.g., New York), outbound date (e.g., Dec. 27, 2013) and return date (e.g., Jan. 6, 2014). Optionally, search query 10 includes a value for the confidence threshold which switch 6 is going to apply.

Switch 6 receives the search query 10 and relays search query 10 to server 2a by message 13. In response to receiving message 13, server 2a performs a database lookup in the pool of pre-collected search results by using the search criteria included in search query 10 and message 13. By message 14, server 2a returns the retrieved pre-collected search results fulfilling the search criteria. These pre-collected search results include the associated confidence factor values.

Switch 6 receives the pre-collected search results with message 14 from server 2a, analyzes the associated confidence factor values, and compares the associated confidence factor values with the confidence threshold. Switch 6 forwards pre-collected search results with confidence factor values at or above the confidence threshold to the client 4 by return message 15. On the other hand, switch 6 requests validation of pre-collected search results having confidence factor values below the confidence threshold with primary data source 5. To this end, switch 6 sends request message 16 to primary data source 5. Request message 16 might contain the primary key values of the pre-collected search results to be validated in order to specifically request the pre-collected search results to be validated from the primary data source 5. Primary data source 5 looks up the request search results and returns the original and therefore valid search results to switch 6 with message 17. Finally, switch 6 forwards the validated search results to client 4 by message 18.

Note that the primary data source 5 may actually include more than one data source, e.g., a plurality of databases, web server, computation platforms, etc. Thus, messages 16 and 17 may be decomposed into several sub-messages which are sent to the plurality of primary data sources. Messages 16 and 17 may also formed by a plurality of sub-messages if the primary data source 5 is a single data source, for example, in order to realize an incremental validation as explained next.

Optionally, in some embodiments, the switch 6 is additionally arranged to control the validation of the pre-collected search results below the confidence threshold in a more sophisticated manner. For example, switch 6 request validation of only a subset of the pre-collected search results below the confidence threshold, while other pre-collected search results below the confidence threshold are not validated (and, thus, not forwarded to the client 4). The subset may, for example, be formed by an available time for validation. Thus, for example, switch 6 performs the validation in an incremental way (e.g., a single request message 16 is decomposed into a plurality of validation requests which are serially sent to the primary data source 5 for every pre-collected search result to be validated) and stops sending requests 16 to the primary data source 5 after a given period of time. In this way, the validation controlled by switch 6 times out. In other embodiments, switch 6 indicates the time available for validation to the primary data source 5 and it is the primary data source 5 which stops the validation activity after the time is elapsed. The subset may, additionally or alternatively, be formed by a limit of the number of pre-collected search results to be requested from the primary data source 5 or by computation resources available at the primary data source 5. For example, switch 6 may be arranged to decide to only validate a given number of pre-collected search results (for example, twenty pre-collected search results) and request validation of that given number from the primary data source 5 while pre-collected search results in excess of the given number may be discarded by the switch 6.

Figure 10:
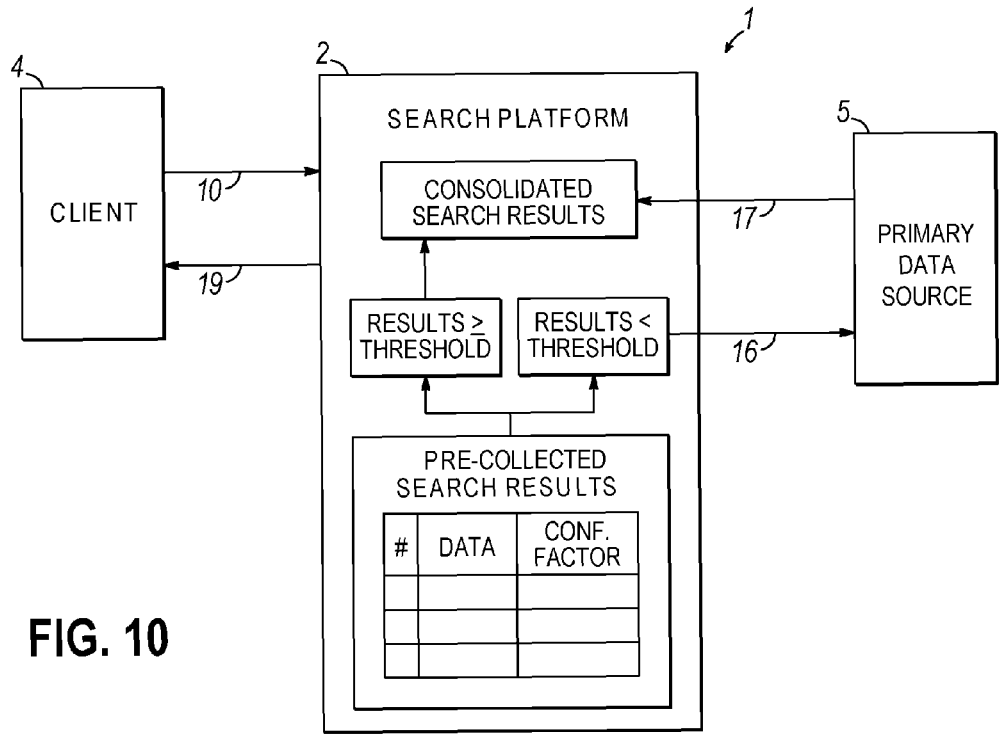
FIG. 10 shows a fourth example according to which the search platform performs a further query to a primary data source.
Figure 11:
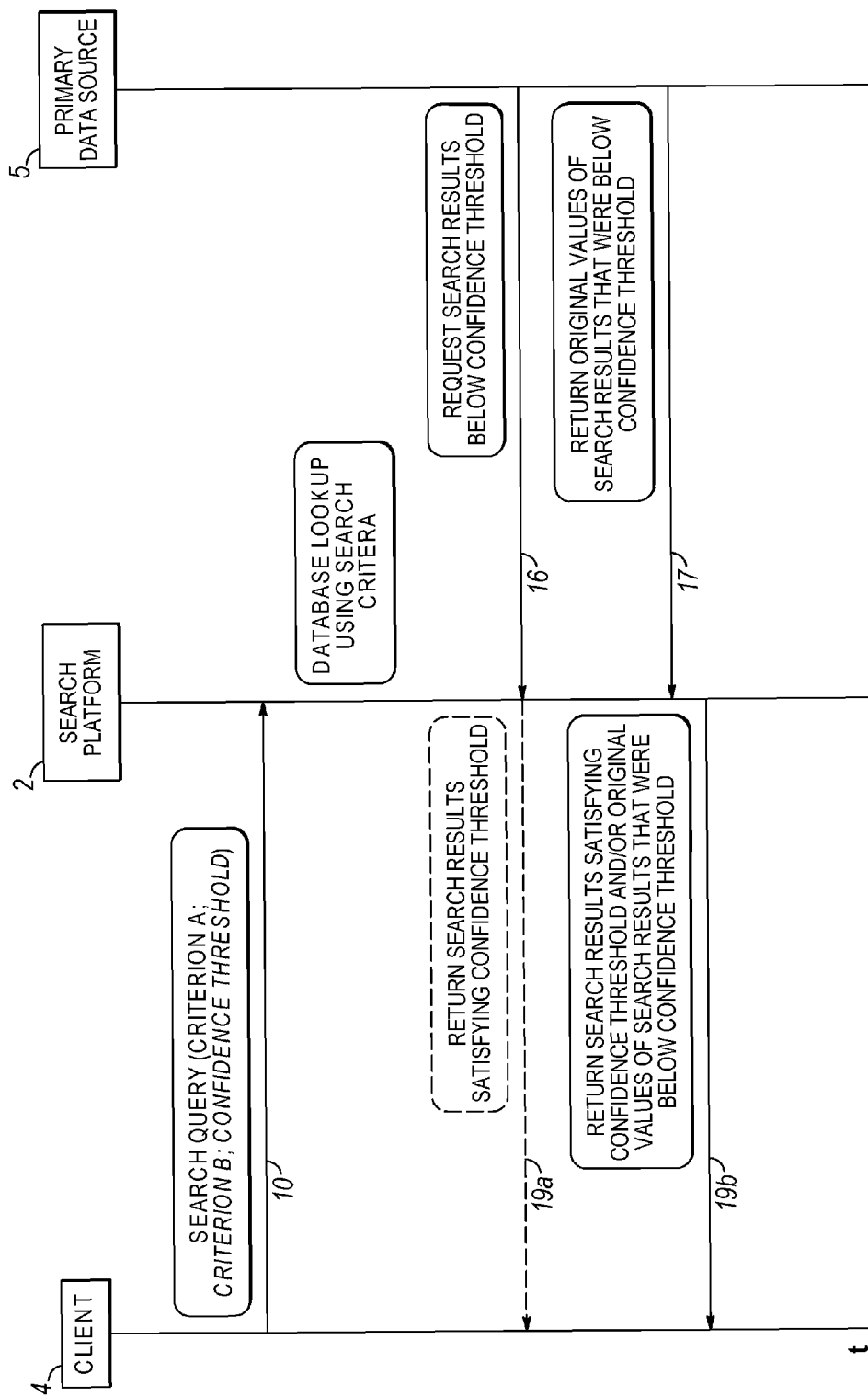
FIG. 11 is a message sequence chart relating to the example of FIG. 10.

A fourth example is given by FIGS. 10 and 11. This fourth example is more general than the third example of FIGS. 8 and 9 in that it is the search platform 2 which performs the revalidation of pre-collected search results with confidence factor values below the confidence threshold with the primary data source 5. Apart from that, the same principles as explained in the third example apply to the fourth example.

Similar to the third example, search platform 2 receives a search query 10 from client 4 (FIGS. 10 and 11). Search platform 2 then performs a search in the database of pre-collected search results for search results corresponding to the search criteria included in the search query 10. Pre-collected search results having confidence factor values below the threshold are re-validated by search platform 2 with primary data source 5 by message 16. The search platform receives the validated search results from primary data source 5 with message 17 and, for example, consolidates the re-validated search results received from primary data source 5 with the pre-collected search results having confidence factors at or above the confidence threshold. Search platform 2 then transmits the consolidated search results to client 4 by message 19.

As described above for the third example, message 19 might be a single message including all search results to be returned to client 4 or message 19 might be split up into several messages, for example, into messages 19a (FIG. 11) carrying the pre-collected search results at or above the confidence threshold (as they are available earlier than the re-validated pre-collected search results below the threshold) and further messages 19b (FIG. 11) carrying the search results re-validated with primary data source 5 (as they are available only at a later point of time).

Figure 12:
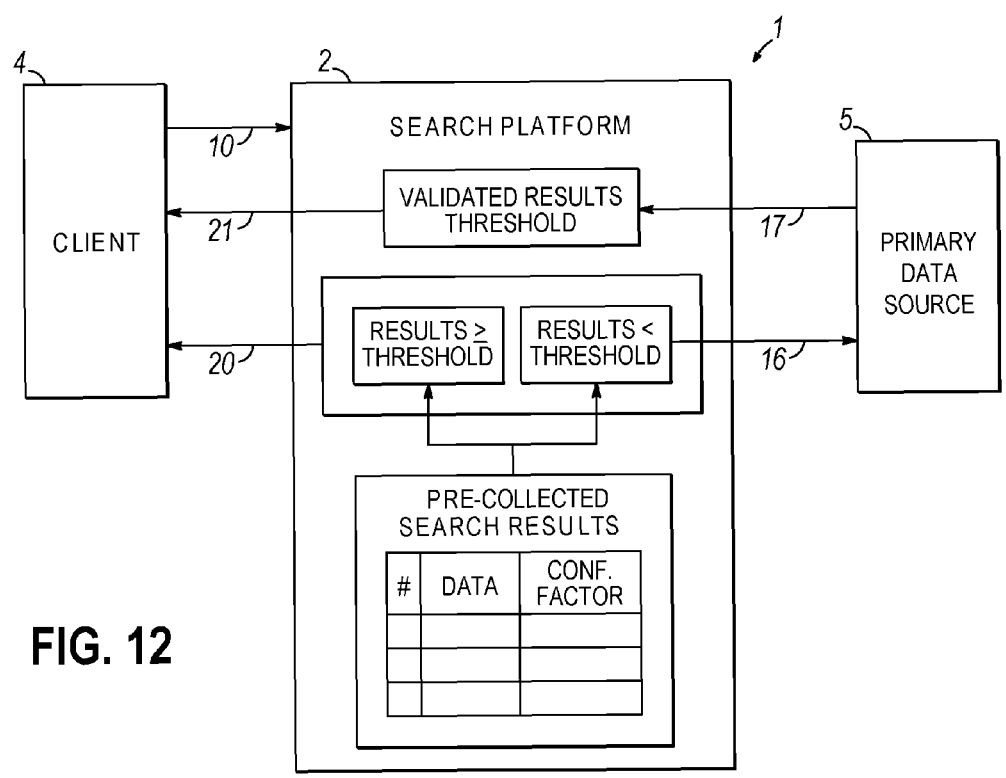
FIG. 12 shows a fifth example according to which the search platform first returns pre-computed search results to the client and performs re-validation subsequently.
Figure 13:
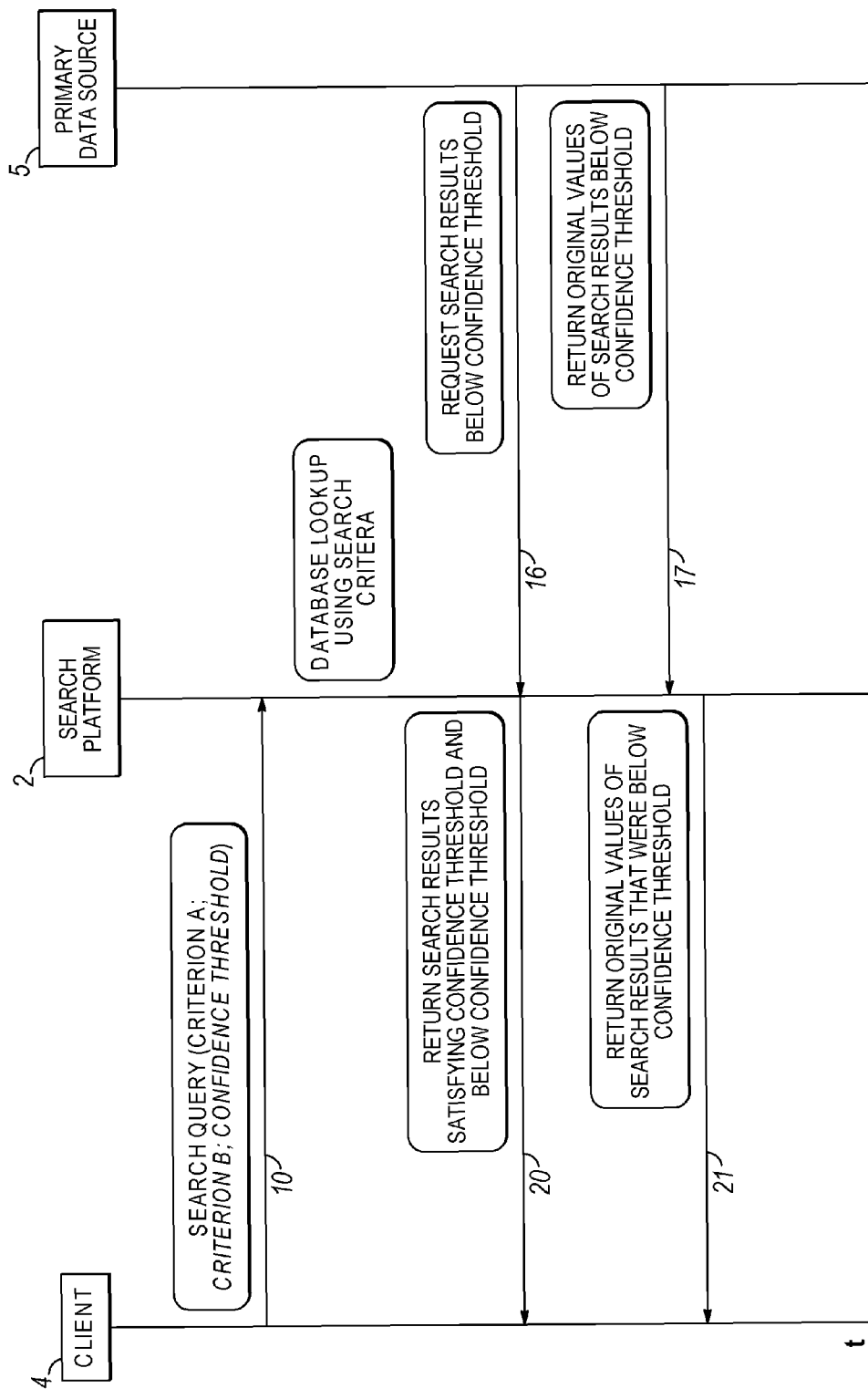
FIG. 13 is a message sequence chart relating to the example of FIG. 12.

A fifth example is given by FIGS. 12 and 13. The fifth example is a further variation of the third and fourth examples. According to this fifth example, the search platform 2 first returns the pre-collected search results complying with the at least one search criteria included in the search query 10 and only validates these pre-collected search results below the confidence threshold in parallel and/or subsequently. The search platform 2 then returns the validated search results to the client 4, thereby updating the initially returned pre-collected search results below the confidence threshold with the corresponding validated search results and, thus, increasing the probability of these search results being valid.

Hence, similar to the third example and to the fourth example, search platform 2 receives a search query 10 from client 4 (FIGS. 12 and 13). Search platform 2 then performs a search in the database of pre-collected search results for search results corresponding to the search criteria included in the search query 10. Search platform 2 then returns all pre-collected search results, irrespective of the pre-collected search results' confidence factor values (below, at, or above the threshold) to the client 4 by message 20 (again, message 20 may include one or more individual sub-messages). The pre-collected search results below the confidence threshold are, however, re-validated by search platform 2 with primary data source 5 by message 16 in a similar manner as in the third example or in the fourth example. The search platform 2 receives the validated search results from primary data source 5 with message 17. Search platform 2 then transmits the validated search results to client 4 by message 21. Client 4 processes the validated search results and updates the corresponding pre-collected search results below the confidence threshold initially received from the search platform 2 with the validated search results (e.g., by overwriting the pre-collected search results below the confidence threshold initially received from the search platform 2 with the validated search results and displaying the updated search results to the user).

The validation processes formed by messages 16, 17 and 21 may occur incrementally and in parallel or subsequently to returning the initial pre-collected search results by message 20. To this end, messages 16, 17 and 21 may be subdivided into a plurality of sub-messages as already explained above with reference to FIGS. 8 and 9. In addition, a validation control as also described with reference to FIGS. 8 and 9 may be employed; for example, the validation process of messages 16, 17 and 21 may be capped to a given amount of validation time or computation/collection resources.

Figure 14:
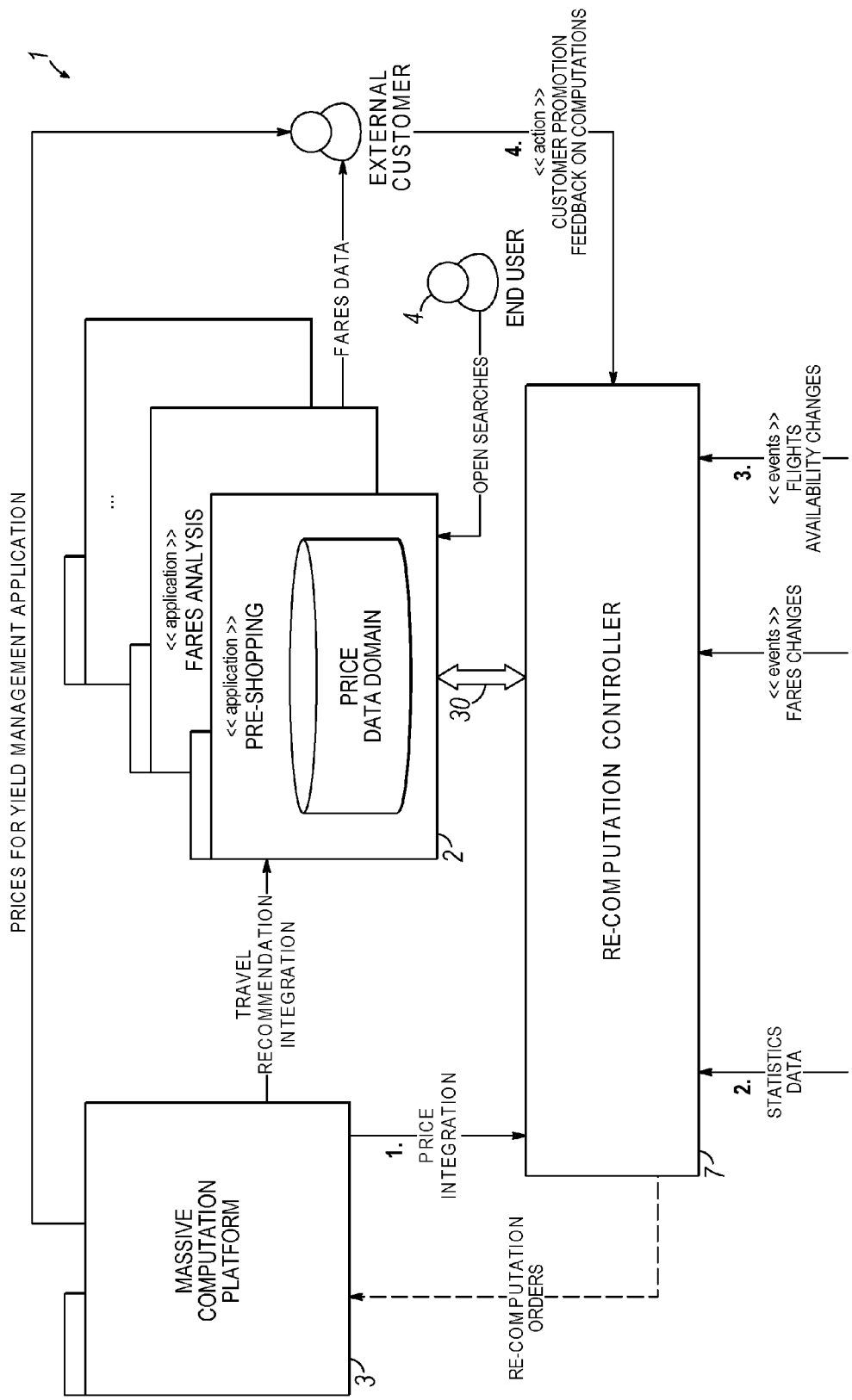
FIG. 14 depicts an exemplary architecture example of a distributed travel-related database environment.

FIG. 14 shows an application example of the database system 1. This application example relates to a database system used in the travel industry. More specifically, in this embodiment, the computation platform 3 maintains data on air travel offers. A plurality of search platforms 2 store prices related to these air travel offers which the computation platform 3 calculates on the basis of calculation rules, in particular flight fares and their associated calculation rules. In the example of FIG. 14, the computation platform 3 may be a Massive Computation Platform (MCP) as disclosed by European Publication No. 2521074, which is hereby incorporated by reference herein in its entirety. The search platforms 2 and the MCP 3 are coupled via communication links which are utilized to transmit pre-computed priced travel recommendations from the MCP 3 to the search platforms 2.

Furthermore, the database system 1 includes a re-computation controller 7 which is responsible for monitoring the validity of the pre-computed priced travel recommendations stored in the search platforms 2 and for deciding which pre-computed priced travel recommendations are to be re-computed by MCP 3. In the example of FIG. 14, the re-computation controller 7 employs a probabilistic model for tracking the validity probabilities of the pre-computed priced travel recommendations stored in the search platforms 2. The probabilistic model may be based on the parameters as described above with reference to FIG. 3. To this end, the re-computation controller is equipped with several communication interfaces in order to input statistical data for estimating change rates of flight fares and calculation rules as well as to recognize external events such as fare changes, customer promotions and flight availability changes. In the example of FIG. 14, the confidence factor values of the pre-computed priced travel recommendations are maintained centrally by the re-computation controller 7 for all search platforms 2. In the course of processing search queries from clients 4, search platform 2 request confidence factor values associated with the pre-computed priced travel recommendations fulfilling the search criteria included in the search queries from re-computation controller 7 via interface 30. In response to this request, re-computation controller 7 performs the appropriate processing (for example, calculates $e^{-\lambda t}$ for each requested pre-collected search result on the basis of the respective values of the validity rate $\lambda$, the timestamp TS and $TS_s$) and returns the requested confidence factor values to the search platform 2. Alternatively, each search platform 2 may maintain the confidence factor values associated with the stored pre-computed priced travel recommendations, for example as shown by FIG. 3 and described above. In this case, the search platforms 2 are equipped with the aforementioned communication interfaces in order to maintain the probabilistic model by themselves. In other embodiments, the confidence factor values stored in the search platforms 2 may also be updated by the re-computation controller 7 on, for example, a periodic basis.

As also indicated by FIG. 14, the search platforms 2 may implement various applications. For example, a pre-shopping application serves as an unbinding information platform by which the clients 4 can obtain information about flight routes, flight schedules and prices, hotel room availability, rental car services, etc. without having to make an actual reservation. Another application may be an advertisement banner application which provides data for travel advertisement banner to Internet websites being subscribed to such banner advertisement. Whenever a client 4 retrieves an Internet website hosting advertisement banners, the banner content is dynamically loaded from a banner application search platform 2 in response to banner search queries automatically generated by client 4. The dynamically loaded banner content may depend on interests of the user determined, for example, by cookies or browsing history data of client 4. For this application, the first example of filtering pre-collected search results as described with reference to FIGS. 4 and 5 may be suitable because it may not be necessary avoid holes in the priced travel advertisements. Rather, short response times of the advertisement banner may be more important.

As another additional optional functionality, the confidence factor associated with the pre-collected search results that are actually returned to the client 4 may be transmitted to client 4 along with the actual search results. In the case of re-validated search results returned to the client 4 (third, fourth and fifth examples, FIGS. 8 to 13), confidence factor values of 100% may be returned to client 4. Client 4 may be arranged to process the confidence factor values (which are all at or above the confidence threshold), for example, to indicate the varying confidence of the various search results to the user. This indication may, for example, be realized by the client 4 by grouping the received search results into classes of different confidence intervals; for example, search results with a confidence factor value of 100% (i.e., the re-validated search results), search results with a confidence factor between 95% and 100% and further search results with a confidence factor below 95%, but still above the confidence threshold.

Figure 15:
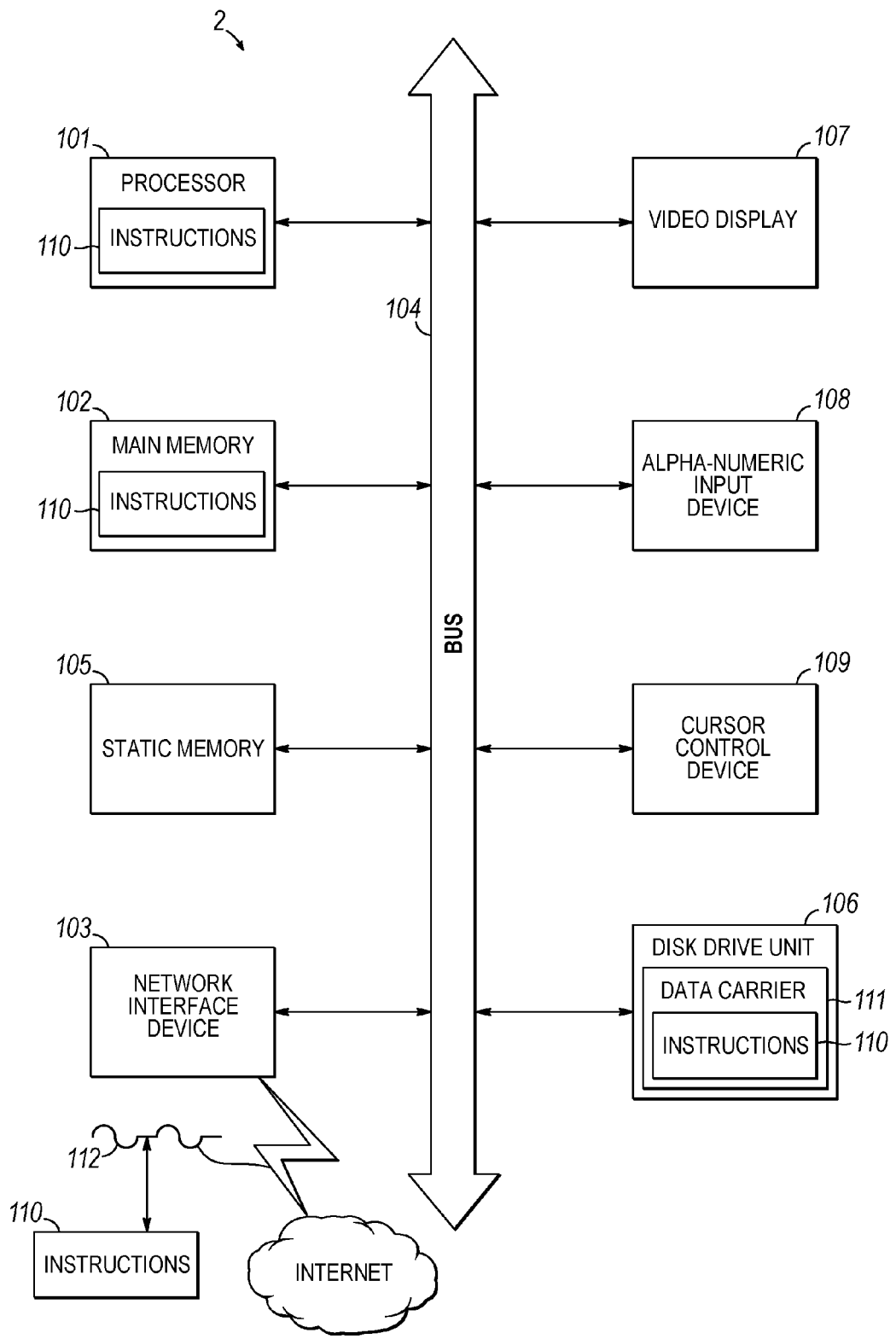
FIG. 15 is an exemplary schematic view of the internal architecture of the search platform and/or the client.

Finally, FIG. 15 is a diagrammatic representation of a computer system which provides the functionality of the search platform 2. Within the search platform 2 a set of instructions, to cause the computer system to perform any of the methods performed by the search platform as discussed herein, may be executed. The search platform 2 includes at least one processor 101, a main memory 102 and a network interface device 103, which communicate with each other via a bus 104. Optionally, the search platform 2 may further include a static memory 105 and a disk-drive unit 106. A video display 107, an alpha-numeric input device 108 and a cursor control device 109 may form a distribution list navigator user interface. The network interface device 103 is wired and/or wireless interface which connects the data search platform 2 to the computation/collection platform 3, the sources of statistical data needed to fill up the probabilistic model such as a statistics search platform, the Internet and/or any other network. The network interface device 103 utilizes either standard communication protocols such as the HTTP/TCP/IP protocol stack, IEEE 802.11 and/or proprietary communication protocols. A set of instructions (i.e. software) 110 embodying any one, or all, of the methodologies described above, resides completely, or at least partially, in or on a machine-readable medium, e.g., the main memory 102 and/or the processor 101. Among others, the instructions may implement the search platform's capabilities to process incoming search queries 10, to perform database lookups among the pre-collected search results and to generate and transmit messages like response messages 11, 12, 14 and 20 as well as request message 17. A machine-readable medium on which the software 110 resides may also be a non-volatile data carrier 111 (e.g., a non-removable magnetic hard disk or an optical or magnetic removable disk) which is part of disk drive unit 106. The software 110 may further be transmitted or received as a propagated signal 112 via the Internet through the network interface device 103.

Client 4 may reside in a stationary computer or a mobile device such as a smartphone, a cell phone, a laptop, a tablet computer or the like which may be of a similar structure as shown by FIG. 15. Accordingly, the instructions 110 embodied in the processor/memory implement the client's functionality to generate and transmit search query 10 and receive, process response messages 11, 12, 14, 19 and 20 and display the search results received from search platform 2 and/or switch 6.

As described above, switch 6 may be included in the search platform 2 or may be provided as a separate hardware entity. In the latter case, switch 6 may also be of similar structure as shown by FIG. 15.

The present approach of utilizing confidence factor values associated with pre-collected search results and confidence thresholds allow increasing the reliability of pre-collected/pre-computed search results provided to clients at search time. It can be advantageously combined with an improved strategy of re-computing/re-collecting the pre-computed/pre-collected search results as, for example, described by International Application No. PCT/EP2013/002390.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of handling travel queries, the method comprising:

maintaining, by a travel search platform, a plurality of pre-computed priced travel recommendations, each pre-computed priced travel recommendation having been previously computed based on underlying data obtained from a primary data source at a time that the pre-computed priced travel recommendation was computed;

associating, by the travel search platform, each pre-computed priced travel recommendation with a corresponding confidence factor that indicates a probability that the associated pre-computed priced travel recommendation is still valid, the pre-computed priced travel recommendation being valid if the underlying data in the primary data source has not changed in a time period passed since the time that the pre-computed priced travel recommendation was computed and being invalid if the underlying data in the primary data source has changed in the time period;

receiving, at the travel search platform, a travel query from a client indicating at least one travel search criterion;

identifying, by the travel search platform from the plurality of pre-computed priced travel recommendations, a set of pre-computed priced travel recommendations that comply with the at least one travel search criterion;

evaluating the confidence factors associated with the identified set of pre-computed priced travel recommendations;

validating the pre-computed priced travel recommendations for which the confidence factor is greater than a given threshold by querying the primary data source for valid database query results;

returning to the client, by the travel search platform, the set of pre-computed priced travel recommendations and the validated priced travel recommendations associated with confidence factors greater than the given threshold in a response to the travel query, wherein the probability the underlying data used to compute a respective pre-computed priced travel recommendation has changed increases as a function of a duration of the time period, and the response to the travel query is returned by sending a first message conveying the set of pre-computed priced travel recommendations and a second message conveying the validated priced travel recommendations associated with confidence factors greater than the given threshold.

2. The method of claim 1 wherein the given threshold is prescribed by the client.

3. The method of claim 1 wherein the given threshold is autonomously set by the search platform.

4. The method of claim 1 wherein the set of pre-computed priced travel recommendations is identified by applying, at the search platform, the given threshold as a further travel search criterion in addition to the at least one travel search criterion indicated by the travel query.

5. The method of claim 1 further comprising:
validating the pre-computed priced travel recommendations for which the confidence factor is less than the given threshold by querying the primary data source for valid database query results; and
returning the validated pre-computed priced travel recommendations associated with confidence factor values less than the given threshold to the client.

6. The method of claim 5 wherein the set of pre-computed priced travel recommendations is returned to the client before the set of pre-computed priced travel recommendations is validated with the primary data source, and further comprising:
updating the set of pre-computed priced travel recommendations at the client with the validated pre-computed priced travel recommendations.

7. The method of claim 1 comprising:
deriving confidence factor values from a probabilistic model that models a validity of pre-computed priced travel recommendations over time.

8. The method of claim 1 wherein the probability of a pre-computed priced travel recommendation i being valid at a time t after a previous collection of the pre-computed priced travel recommendation i is given by $e^{-\lambda_i t}$, wherein $\lambda_i$ denotes a decrease rate of the probability of the pre-collected search result i being valid and $t_i$ denotes a time since a last re-computation of the pre-computed priced travel recommendation i.

9. The method of claim 8 wherein $e^{-\lambda_i t}$ is calculated in response to the travel query based on a stored value of $\lambda_i$ and a difference between a stored value of a time of the last re-computation of the pre-computed priced travel recommendation i and a current time.

10. The method of claim 8 wherein a value of $\lambda_i$ is derived from re-computations of the pre-computed priced travel recommendation i.

11. The method of claim 1 wherein identifying the set of pre-computed priced travel recommendations comprises:
filtering out pre-computed priced travel recommendations complying with the at least one travel search criterion that are associated with confidence factor values below the given threshold.

12. The method of claim 1 wherein the first message is subdivided into first atomic messages each conveying a single identified pre-computed priced travel recommendation, the second message is subdivided into second atomic messages each conveying a single validated priced travel recommendation, and the first and second atomic messages are sent in an incremental manner.

13. A system comprising:
at least one processor; and
program code configured to be executed by the at least one processor to cause the at least one processor to:
maintain a plurality of pre-computed priced travel recommendations, each pre-computed priced travel recommendation having been previously computed based on underlying data obtained from a primary data source at a time that the pre-computed priced travel recommendation was computed;
associate each pre-computed priced travel recommendation with a corresponding confidence factor that indicates a probability that the associated pre-computed priced travel recommendation is still valid, the pre-computed priced travel recommendation being valid if the underlying data in the primary data source has not changed in a time period passed since the time that the pre-computed priced travel recommendation was computed and being invalid if the underlying data in the primary data source has changed in the time period;
receive a travel query from a client indicating at least one travel search criterion;
identify, from the plurality of pre-computed priced travel recommendations, a set of pre-computed priced travel recommendations that comply with the at least one travel search criterion;
evaluate the confidence factors associated with the identified set of pre-computed priced travel recommendations;
validate the pre-computed priced travel recommendations for which the confidence factor is greater than a given threshold by querying the primary data source for valid database query results; and
return to the client the set of pre-computed priced travel recommendations and the validated priced travel recommendations associated with confidence factors greater than the given threshold in a response to the travel query, wherein
the probability the underlying data used to compute a respective pre-computed priced travel recommendation has changed increases as a function of a duration of the time period, and
the response to the travel query is returned by sending a first message conveying the set of pre-computed priced travel recommendations and a second message conveying the validated priced travel recommendations associated with confidence factors greater than the given threshold.

14. The system of claim 13 wherein the program code is configured to be executed by the at least one processor to cause the at least one processor to:
apply the given threshold as a further travel search criterion in addition to the at least one travel search criterion indicated by the travel query.

15. The system of claim 13 wherein the program code is configured to be executed by the at least one processor to cause the at least one processor to:
validate the pre-computed priced travel recommendations for which the confidence factor is less than the given threshold by querying the primary data source for valid database query results; and
return the validated pre-computed priced travel recommendations corresponding to the query to the client.

16. The system of claim 15 wherein the set of pre-computed priced travel recommendations is returned to the client before the set of pre-computed priced travel recommendations is validated with the primary data source, and the program code is configured to be executed by the at least one processor to cause the at least one processor to:
update the set of pre-computed priced travel recommendations at the client with the validated pre-computed priced travel recommendations.

17. The system of claim 13 wherein the program code is configured to be executed by the at least one processor to cause the at least one processor to:

filter out pre-computed priced travel recommendations complying with the at least one travel search criterion that are associated with confidence factor values below the given threshold.

18. The system of claim 13 wherein the program code is configured to be executed by the at least one processor to cause the at least one processor to:
derive confidence factor values from a probabilistic model that models a validity of pre-computed priced travel recommendations over time.

19. The system of claim 13 wherein the probability of a pre-computed priced travel recommendation result i being valid at a time t after a previous collection of the pre-computed priced travel recommendation i is given by $e^{-\lambda_i t}$, wherein $\lambda_i$ denotes a decrease rate of the probability of the pre-computed priced travel recommendation i being valid and $t_i$ denotes a time of since a last re-collection of the pre-computed priced travel recommendation i.

20. The system of claim 13 wherein the first message is subdivided into first atomic messages each conveying a single identified pre-computed priced travel recommendation, the second message is subdivided into second atomic messages each conveying a single validated priced travel recommendation, and the first and second atomic messages are sent in an incremental manner.

21. A system comprising:
a travel search platform; and
a client configured to transmit a travel query indicating at least one travel search criterion to the travel search platform,
wherein the travel search platform is configured to:
maintain a plurality of pre-collected search results, each pre-computed priced travel recommendation having been previously computed based on underlying data obtained from a primary data source at a time that the pre-computed priced travel recommendation was computed;
associate each pre-computed priced travel recommendation with a corresponding confidence factor that indicates a probability that the associated pre-computed priced travel recommendation is still valid, the pre-computed priced travel recommendation being valid if the underlying data in the primary data source has not changed in a time period passed since the time that the pre-computed priced travel recommendation was computed and being invalid if the underlying data in the primary data source has changed in the time period;
receive the travel query from the client indicating the at least one travel search criterion;
identify, from the plurality of pre-computed priced travel recommendations, a set of pre-computed priced travel recommendations that comply with the at least one travel search criterion;
evaluate the confidence factors associated with the identified set of pre-computed priced travel recommendations;
validate the pre-computed priced travel recommendations for which the confidence factor is greater than a given threshold by querying the primary data source for valid database query results; and
return to the client the set of pre-computed priced travel recommendations and the validated priced travel recommendations associated with confidence factors greater than the given threshold in a response to the travel query, wherein
the probability the underlying data used to compute a respective pre-computed priced travel recommendation has changed increases as a function of a duration of the time period, and
the response to the travel query is returned by sending a first message conveying the set of pre-computed priced travel recommendations and a second message conveying the validated priced travel recommendations associated with confidence factors greater than the given threshold.

22. A computer program product comprising:
a non-transitory computer readable storage medium; and
program code stored on the computer readable storage medium and configured, upon execution, to cause at least one processor to:
maintain a plurality of pre-collected search results, each pre-computed priced travel recommendation having been previously computed based on underlying data obtained from a primary data source at a time that the pre-computed priced travel recommendation was computed;
associate each pre-computed priced travel recommendation with a corresponding confidence factor that indicates a probability that the associated pre-computed priced travel recommendation is still valid, the pre-computed priced travel recommendation being valid if the underlying data in the primary data source has not changed in a time period passed since the time that the pre-computed priced travel recommendation was computed and being invalid if the underlying data in the primary data source has changed in the time period;
receive the travel query from the client indicating the at least one travel search criterion;
identify, from the plurality of pre-computed priced travel recommendations, a set of pre-computed priced travel recommendations that comply with the at least one travel search criterion;
evaluate the confidence factors associated with the identified set of pre-computed priced travel recommendations;
validate the pre-computed priced travel recommendations for which the confidence factor is greater than a given threshold by querying the primary data source for valid database query results; and
return to the client the set of pre-computed priced travel recommendations and the validated priced travel recommendations associated with confidence factors greater than the given threshold in a response to the travel query, wherein
the probability the underlying data used to compute a respective pre-computed priced travel recommendation has changed increases as a function of a duration of the time period, and
the response to the travel query is returned by sending a first message conveying the set of pre-computed priced travel recommendations and a second message conveying the validated priced travel recommendations associated with confidence factors greater than the given threshold.

* * * * *